May 24, 1949.  J. M. DUNSTON  2,470,765
BREAD COOLING AND PROOFING RACK
Filed Sept. 11, 1945
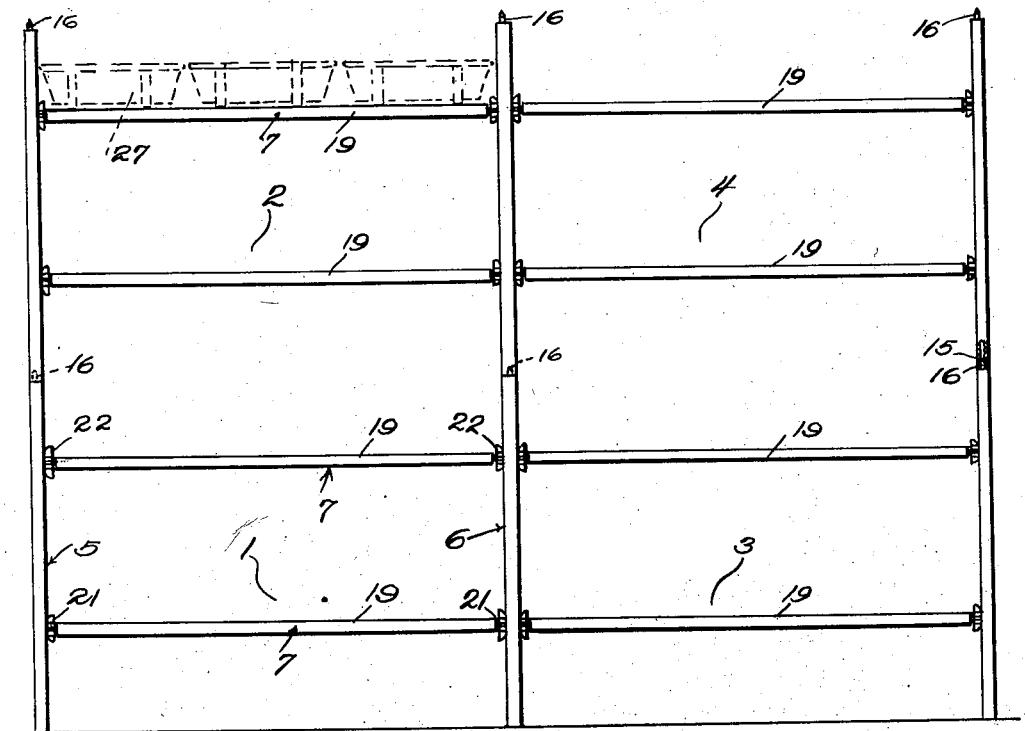
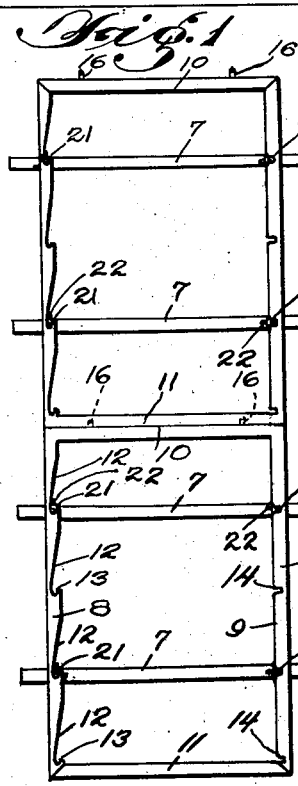
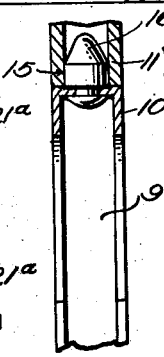
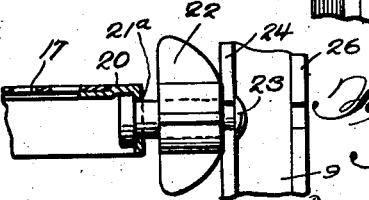
INVENTOR.
James M. Dunston
BY
William F. Diamond
ATTORNEY Patented May 24, 1949

2,470,765

UNITED STATES PATENT OFFICE 2,470,765

BREAD COOLING AND PROOFING RACK

James M. Dunston, Jeffersonville, Ind.

Application September 11, 1945, Serial No. 615,685

7 Claims. (Cl. 211—136)

(Granted under the act of March 3, 1883, as amended April 30, 1928; 370 O. G. 757)

The invention described herein if patented may be manufactured and used by or for the Government for governmental purposes, without the payment to me of any royalty thereon.

This invention relates to racks and more particularly to racks of the type used in the baking industry for the cooling and proofing of bread.

An object of my invention is to provide a bread cooling and proofing rack which is simple in design, light in weight, and durable in structure.

Another object of my invention is to provide for quickly assembling and disassembling a bread rack.

Further objects, advantages, and features of my invention will be apparent from the following description, taken in conjunction with the accompanying drawing in which:

Figure 1 is a front elevational view of a bread cooling and proofing rack constructed according to my invention;

Figure 2 is a side elevational view of the rack shown in Figure 1, looking from the right hand end;

Figure 3 is a fragmentary, detailed side elevational view, certain parts being shown in section, of the standards which support the shelves of my rack, illustrating the means employed to mount one standard on top of another;

Figure 4 is a fragmentary, detailed, top plan view, certain parts being shown in section, of a portion of the rack of my invention, illustrating the manner in which the shelves are attached to the standard; and Figure 5 is a detailed sectional view taken along the line 5—5 of Figure 4.

The bread cooling and proofing rack of my invention comprises a plurality of sections, four of which are shown in Figure 1 and identified by the numerals 1, 2, 3, and 4. Each section comprises a pair of frames 5 and 6 and a plurality of shelves 7 supported by the frames. When two or more sections are assembled in side-by-side relationship, as illustrated by sections 1 and 3 in Figure 1, the frame 6 is common to both sections. The rack of my invention may be used as a bread cooling rack, a dough proofing rack or both. When used as a proofing rack the dough is placed in pans 27, shown by broken lines in Figure 1, which are placed on the shelves 7.

Each frame, as illustrated more clearly in Figure 2, comprises four channels comprising two standards 8 and 9, a top member 10 and a bottom member 11 joined to each other to form a rectangular frame. Each flange of the standard 8 is provided with a plurality of curved indentations 12 terminating in notches or bearing surfaces 13. Each flange of the standard 9 is provided with a plurality of slots 14. The manner in which shelves 7 are supported in these notches and slots is described more fully below.

The bottom member 11 of each frame 5 or 6 is provided with two apertures 15 and the top member 10 of each frame is provided with two studs or pins 16. When one section is mounted on top of another, (sections 1 and 2 of Figure 1) the studs or pins 16 fit into the apertures 15 (Figure 3).

The shelf 7 comprises a screen 17 supported by a rectangular frame 18 of L-shaped cross-section (Figure 4). The frame 18 comprises front and rear members 19 and side members 20. Each of the two side members 20 of each shelf is provided with two threaded pins, a front pin 21 and a rear pin 21a. The pins 21 and 21a are attached to the flange portion of the members 20 (Figures 4 and 5). A wing nut 22 is disposed on the threaded portion of each pin. The end of the pin which extends outwardly from the member 20 is provided with a head 23.

When the rack of my invention has been assembled, the shelves 7 are supported in the notches 13 and slots 14 in the flanges of the standards 8 and 9 and locked in position by tightening the nuts 22 against the flanges of these standards. The first step in assembling the rack is to screw the nuts 22 back against the side members 20 of the shelves 7. This is done to provide sufficient space between the nuts and the heads 23 of the pins 21 and 21a for the reception therebetween of a flange of the standards 8 and 9. The rear portion of a shelf 7 is positioned by placing the pins 21a in the slots 14, with the inside flange of the channel members 9 between the heads 23 of the pins 21a and the nuts 22. The front portion of the shelf is then lowered into position, the pins 21 passing through the curved portion 12 of the inside flanges of the standard 8 until they come to rest in the notches 13, with the inside flanges of the standard 8 between the heads 23 of the pins 21 and the nuts 22. The radius of curvature of the indentations 12 is substantially the same as the distance between pins 21 and 21a. All nuts 22 are then tightened against the flanges of the standards 8 and 9 thereby locking the shelves 7 thereto.

Thus it may be seen that the rack of my invention may be assembled and disassembled with comparative ease. Its two basic components are the frames 5 and 6 and the shelves 7. A shelf may be readily removed from the frames by first loosening the four nuts 22 which lock the shelf to the flanges of the standards 8 and 9. The front of the shelf is then raised until the laterally projecting pins 21 "ride" out of the curved indentations 12. The shelf is then drawn forward to remove the pins 21a from the slots 14.

Another feature of the rack of my invention is that each section is constructed so that other sections may readily be added. The top member 10 of each frame 5 and 6 is provided with two studs or pins 16 and the bottom member 11 is provided with two apertures 15, as described. Thus when it is desired to mount one section on top of another, the new section may be assembled and then placed on top of the original section, the studs or pins 16 fitting into the apertures 15 as shown in Figure 3.

The sections may also be joined to each other in side-by-side relationship as illustrated in Figure 1, where sections 1 and 3 are joined to each other, the frame 5 being common to both sections. This advantageous construction feature is made possible by using channel standards 8 and 9. Since each standard has two spaced flanges, the shelves of one section are connected to one flange and the shelves of the adjoining section are connected to the other flange of the common standard. This is illustrated in Figure 4 where a shelf of section 1 is connected to the flange 24 of the standard 9, and the pin 25 from a shelf in section 3 is connected to the flange 26.

Having thus described my invention, what I claim is:

1. A shelf-supporting frame comprising connected front and rear standards, said rear standards being provided with vertically spaced slots and said front standards being provided with vertically spaced curved indentations, said indentations being opposite said slots and having a radius of curvature corresponding substantially to the distance between opposed slots and indentations.

2. A shelf-supporting frame comprising connected front and rear standards, said rear standards being provided with vertically spaced slots and said front standards being provided with vertically spaced curved indentations terminating in notches, said notches being opposite said slots, and said indentations having a radius of curvature corresponding substantially to the distance between the opposed slots and indentations.

3. A shelf-supporting frame comprising connected front and rear channeled standards, the flanges of each of said rear standards being provided with vertically spaced slots and the flanges of each of said front standards being provided with vertically spaced curved indentations terminating in notches, said notches being opposite said slots, and said indentations having a radius of curvature corresponding substantially to the distance between opposed slots and indentations.

4. A rack comprising front and rear standards, said rear standards being provided with vertically spaced slots and said front standards being provided with vertically spaced curved indentations terminating in notches, said notches being opposite said slots, a plurality of vertically spaced shelves supported by said standards, two laterally projecting threaded pins connected to each of two opposite sides of each of said shelves, each of said pins being provided with a head on the outer end thereof, and nuts disposed on the threaded portions of said pins whereby said shelves may be securely attached to said standards when said shelves are positioned with that portion of the pins between the nuts and the heads thereof disposed in the slots and the notches of said standards and the nuts are tightened against said standards.

5. A rack comprising front and rear channeled standards, the flanges of said rear standards being provided with vertically spaced U-shaped slots and the flanges of each of said front standards being provided with vertically spaced curved indentations terminating in notches, said notches being opposite said slots, a plurality of vertically spaced shelves supported by the flanges of said standards, two laterally projecting threaded pins connected to each of two opposite sides of each of said shelves, each of said pins being provided with a head on the outer end thereof, and nuts disposed on the threaded portions of said pins whereby said shelves may be securely attached to said flanges when said shelves are positioned with that portion of the pins between the nuts and the heads thereof disposed in the slots and the notches of said flanges and the nuts are tightened thereagainst.

6. A rack comprising front and rear standards, the rear standards being provided with vertically spaced slots and the front standards being provided with vertically spaced indentations terminating in bearing surfaces, said bearing surfaces being opposite the slots, vertically spaced shelves supported by said standards, laterally projecting pins on opposite sides of each shelf and positioned adjacent to the front and rear thereof, said pins being disposed in said slots and upon said bearing surfaces.

7. A rack comprising front and rear standards, the rear standards being provided with vertically spaced slots and the front standards being provided with vertically curved indentations terminating in bearing surfaces, said bearing surfaces being opposite said slots, the radius of curvature of the indentations corresponding substantially to the distance between opposed slots and indentations, vertically spaced shelves supported by said standards, laterally projecting pins on opposite sides of each shelf and positioned adjacent to the front and rear thereof, said pins being disposed in said slots and upon said bearing surfaces.

J. M. DUNSTON.

REFERENCES CITED

The following references are of record in the file of this patent:

UNITED STATES PATENTS

| Number | Name | Date |
|---|---|---|
| 360,547 | Winslow | Apr. 5, 1887 |
| 506,829 | Ohmer | Oct. 17, 1893 |
| 605,291 | Hunter | June 7, 1898 |
| 1,288,010 | Isaac | Dec. 17, 1918 |
| 1,325,174 | Sinnott | Dec. 16, 1919 |
| 1,797,766 | Frye | Mar. 24, 1931 |
| 1,820,716 | Vance | Aug. 25, 1931 |
| 2,003,633 | Johnston | June 4, 1935 |

FOREIGN PATENTS

| Number | Country | Date |
|---|---|---|
| 23,061 | Great Britain | Oct. 9, 1912 |
| 25,879 | Great Britain | Nov. 12, 1913 |